United States Patent
Reddy et al.

(10) Patent No.: US 9,670,402 B2
(45) Date of Patent: Jun. 6, 2017

(54) GELLABLE TREATMENT FLUIDS HAVING ADJUSTABLE GEL TIMES AND METHODS ASSOCIATED THEREWITH

(71) Applicant: Halliburton Energy Services, Inc., Houston, TX (US)

(72) Inventors: B. Raghava Reddy, The Woodlands, TX (US); Larry S. Eoff, Porter, TX (US); Freddy Crespo, Katy, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 0 days.

(21) Appl. No.: 14/876,976

(22) Filed: Oct. 7, 2015

(65) Prior Publication Data

US 2016/0053166 A1 Feb. 25, 2016

Related U.S. Application Data

(62) Division of application No. 13/454,827, filed on Apr. 24, 2012, now Pat. No. 9,175,206.

(51) Int. Cl.
| | |
|---|---|
| *E21B 43/27* | (2006.01) |
| *C09K 8/60* | (2006.01) |
| *C09K 8/88* | (2006.01) |
| *C09K 8/508* | (2006.01) |
| *C09K 8/512* | (2006.01) |

(52) U.S. Cl.
CPC ............ *C09K 8/882* (2013.01); *C09K 8/5083* (2013.01); *C09K 8/512* (2013.01); *C09K 8/887* (2013.01)

(58) Field of Classification Search
None
See application file for complete search history.

(56) References Cited

U.S. PATENT DOCUMENTS

| | | | | |
|---|---|---|---|---|
| 4,834,182 | A | * 5/1989 | Shu | ........................ C09K 8/512 166/275 |
| 4,842,073 | A | 6/1989 | Himes et al. | |
| 6,156,819 | A | 12/2000 | Lai et al. | |
| 6,196,317 | B1 | 3/2001 | Hardy | |
| 7,091,160 | B2 | 8/2006 | Dao et al. | |
| 7,287,587 | B2 | 10/2007 | Reddy et al. | |

(Continued)

OTHER PUBLICATIONS

European Office Action dated Jan. 3, 2017, which issued in European Application No. 13713661.0.

*Primary Examiner* — Jeffrey Washville
(74) *Attorney, Agent, or Firm* — McDermott Will & Emery LLP

(57) ABSTRACT

Gellable treatment fluids may have their gel times modified by using a polymer mixture therein that contains two or more polymers having disparate average molecular weights. Methods for treating a subterranean formation using such gellable treatment fluids can comprise providing a gellable treatment fluid comprising a polymer mixture and a crosslinking agent, introducing the gellable treatment fluid into a subterranean formation, and allowing the gellable treatment fluid to form a gel in the subterranean formation. The polymer mixture comprises a base polymer and an addend polymer, where the base polymer and the addend polymer each comprise an acrylamide monomer unit or a derivative thereof and have different average molecular weights, such that a molecular weight distribution of the polymer mixture contains at least two local maxima.

8 Claims, 7 Drawing Sheets

(56) References Cited

U.S. PATENT DOCUMENTS

| | | |
|---|---|---|
| 7,322,414 B2 | 1/2008 | Reddy et al. |
| 7,325,613 B2 | 2/2008 | Reddy et al. |
| 7,331,390 B2 | 2/2008 | Eoff et al. |
| 8,322,421 B2 | 12/2012 | Reddy et al. |
| 8,522,874 B2 | 9/2013 | Reddy et al. |
| 9,090,811 B2 | 7/2015 | Reddy et al. |
| 9,150,781 B2 | 10/2015 | Reddy et al. |
| 9,175,206 B2 | 11/2015 | Reddy et al. |
| 2004/0020650 A1 | 2/2004 | Burts |
| 2006/0047027 A1 | 3/2006 | Brannon et al. |
| 2007/0244014 A1 | 10/2007 | Weaver et al. |
| 2011/0214866 A1 | 9/2011 | Reddy et al. |
| 2011/0214867 A1 | 9/2011 | Reddy et al. |
| 2012/0037364 A1* | 2/2012 | Guan ................. C09K 8/88 166/270 |

* cited by examiner

GELLABLE TREATMENT FLUIDS HAVING ADJUSTABLE GEL TIMES AND METHODS ASSOCIATED THEREWITH

CROSS-REFERENCE TO RELATED APPLICATIONS

The present application is a divisional of U.S. patent application Ser. No. 13/454,827, filed on Apr. 24, 2012.

BACKGROUND

The present disclosure relates to gellable treatment fluids, and, more specifically, to gellable treatment fluids and methods associated therewith, where the gel times and gel strengths of the treatment fluids may be modified by using a polymer mixture containing two or more polymers having disparate average molecular weights.

Water can often undesirably accompany the production of oil and gas from a well penetrating a subterranean formation. The unwanted production of water from hydrocarbon-producing wells can constitute a considerable technical problem and expense in oilfield operations. If the ratio of produced-water to produced-oil and gas becomes sufficiently large, the cost of separating the water and disposing of it can become a financial barrier to continued production. This can lead to abandonment of a well penetrating a subterranean formation, even when significant amounts of hydrocarbons remain therein.

In a subterranean formation, water's high mobility often allows it to flow to or from a wellbore by way of natural and manmade fractures, high permeability zones, and the like. In such cases, less permeable zones in the formation can be bypassed. The bypassing of less permeable zones can be especially problematic when an aqueous fluid is introduced into the subterranean formation, particularly for the purpose of treating the subterranean formation. For example, in enhanced oil recovery techniques, an aqueous fluid can be introduced into a subterranean formation during water flooding operations. When less permeable zones are present in the subterranean formation, lower oil and gas production can occur from these zones due to a less effective water flooding operation being realized. Likewise, the presence of natural and manmade fractures, high permeability zones, and the like can also pose problems when an aqueous fluid needs to be introduced into a low permeability zone for purposes other than flooding operations. Illustrative situations in which permeation of a lower permeability zone by an aqueous fluid may be desirable include, but are not limited to, stimulation treatments and near-wellbore cleanup operations. In such cases, an aqueous fluid can preferentially enter high permeability zones and bypass the intended target low permeability zone, thereby leading to fluid loss.

One way in which the foregoing problems can be addressed is through conformance control treatments, whereby high permeability zones become fully or partially blocked to fluid flow. In the case of unwanted water production, blockage of water-producing zones can slow or stop the production of water. In the case of water flooding operations, blockage of high permeability zones can enable oil and gas production to take place from low permeability zones that might otherwise be bypassed. In the case of stimulation and near-wellbore cleanup operations, blockage of high permeability zones can allow diversion of a stimulation fluid (e.g., an acid) or well bore cleanup fluid to a low permeability zone.

Conformance control treatments can involve introducing a gellable polymer system into a subterranean formation via an aqueous treatment fluid. The gellable polymer system can form a gel through crosslinking a water-soluble polymer with a crosslinking agent. A number of different crosslinking agents can be used to crosslink water-soluble polymers in a gellable polymer system. Chromium and other transition metal ions can be used to crosslink acrylate polymers and copolymers (e.g., polyacrylamides, partially hydrolyzed polyacrylamides, and acrylamide/acrylate copolymers). Generally, gels formed using such crosslinking agents have proven unsuitable at higher formation temperatures (e.g., above about 175° F.) due to uncontrolled crosslinking rates (e.g., short gel times), crosslinking agent precipitation, polymer degradation, and the like. In addition, chromium and certain other transition metal ions can have an undesirable environmental impact. Acrylamide-containing polymers, copolymers, and partially hydrolyzed variants thereof can also be gelled with polyalkyleneimines and polyalkylenepolyamines.

The gel time and the gel strength of a gellable polymer system are among the factors that can determine the effectiveness of a conformance control treatment. As used herein, the term "gel time" will refer to the time required for a gellable polymer system to convert from a free flowing polymer fluid into a semi-solid substance that has viscoelastic properties. These viscoelastic properties can be determined using standard rheological characterization techniques that will be well known to one having ordinary skill in the art. As used herein, the term "gel strength" refers to the rheology of the gel. If the gel time is too short, introduction or placement of the gellable polymer system into a subterranean formation can prove problematic. Conversely, if the gel time is too long, the gellable polymer system may not form a gel in the desired portion of the subterranean formation, or long periods of downtime may be required before further treatment or production operations can be carried out.

The gel time of a gellable polymer system can generally be modified by changing the amount of the gellable polymer and/or the crosslinking agent. As the concentration of either component increases, the gel time can oftentimes be reduced. Although a shorter gel time can be desirable in many instances, as noted above, a difficulty with this approach is that treatment fluids having higher concentrations of polymer may be overly viscous and difficult to pump into a subterranean formation. Gel time modifiers can be used, if desired, to increase or decrease the gel time if the gellable polymer system's native gel time is unsuitable for a given application.

The molecular weight of the polymer can also have an impact on the gel strength and the viscosity of the treatment fluid. In some downhole applications, it may be more desirable to form stiff, ringing gels having a high gel strength upon crosslinking. In other instances, it may be more desirable to form deformable, lipping gels having a lower gel strength. Properties of such gels will be familiar to one having ordinary skill in the art and are described in more detail below. Lower molecular weight polymers may be preferable for the formation of stiff, ringing gels, albeit at higher polymer loadings. At higher polymer loadings, the viscosity of the treatment fluid can become undesirably high, and the cost of goods can become prohibitive. Higher molecular weight polymers can be gelled at lower concentrations, but the treatment fluid viscosity can again be undesirably high, and the gel strength can be reduced due to formation of a deformable, lipping gel by the higher molecular weight polymer. In addition to influencing the gel strength, the molecular weight of the polymer may also alter the gel time of a gellable polymer system.

In addition, the gel time of a gellable polymer system can be a function of temperature. Generally, at higher formation temperatures, the gel time can be reduced. The polymer concentration in a treatment fluid can be changed in response to the formation temperature, but the gel strength may become poor if the polymer concentration has to be lowered too much. The polymer itself may be replaced with another polymer in order to modify the gel time and/or gel stability, possibly in response to the formation temperature. None of the foregoing approaches, however, offer the opportunity to readily modify the gel strength without undesirably affecting the gel time or other property of a treatment fluid, thereby impacting process efficiency.

In addition to the conformance treatments described above, gellable polymer systems can also find use in other types of treatment operations, particularly those that utilize a particle suspension in performing the treatment operation. Among the treatment operations that can utilize a gellable polymer system in conjunction with the treatment include, for example, fracturing operations, gravel packing operations, and stimulation operations, such as acidizing operations. Again, using presently available approaches, there is no simple way to modify the gel strength of the gellable polymer system without undesirably affecting the gel time or other related property of the treatment fluid.

SUMMARY OF THE INVENTION

The present disclosure relates to gellable treatment fluids, and, more specifically, to gellable treatment fluids and methods associated therewith, where the gel times and gel strengths of the treatment fluids may be modified by using a polymer mixture containing two or more polymers having disparate average molecular weights.

In some embodiments, the present invention provides a method comprising: providing a gellable treatment fluid that comprises: a polymer mixture comprising a base polymer and an addend polymer, the base polymer and the addend polymer each comprising an acrylamide monomer unit or a derivative thereof and having different average molecular weights, such that a molecular weight distribution of the polymer mixture contains at least two local maxima; and a crosslinking agent; introducing the gellable treatment fluid into a subterranean formation; and allowing the gellable treatment fluid to form a gel in the subterranean formation.

In some embodiments, the present invention provides a method comprising: providing a gellable treatment fluid that comprises: a polymer mixture comprising a base polymer and an addend polymer, the base polymer and the addend polymer each comprising an acrylamide monomer unit or a derivative thereof; wherein an average molecular weight ratio of the addend polymer to the base polymer is at least about 7:1; and a crosslinking agent; introducing the gellable treatment fluid into a subterranean formation; allowing the gellable treatment fluid to form a gel in the subterranean formation; and at least partially blocking the flow of an aqueous fluid in the subterranean formation with the gel.

In some embodiments, the present invention provides a gellable treatment fluid comprising: a polymer mixture comprising a base polymer and an addend polymer, the base polymer and the addend polymer each comprising an acrylamide monomer unit or a derivative thereof and having different average molecular weights, such that a molecular weight distribution of the polymer mixture contains at least two local maxima; and a crosslinking agent comprising a transition metal ion or a crosslinking polymer.

The features and advantages of the present invention will be readily apparent to one having ordinary skill in the art upon a reading of the description of the preferred embodiments that follows.

BRIEF DESCRIPTION OF THE DRAWINGS

The following figures are included to illustrate certain aspects of the present invention, and should not be viewed as exclusive embodiments. The subject matter disclosed is capable of considerable modification, alteration, and equivalents in form and function, as will be evident to one having ordinary skill in the art and the benefit of this disclosure.

DETAILED DESCRIPTION

Figure 1:
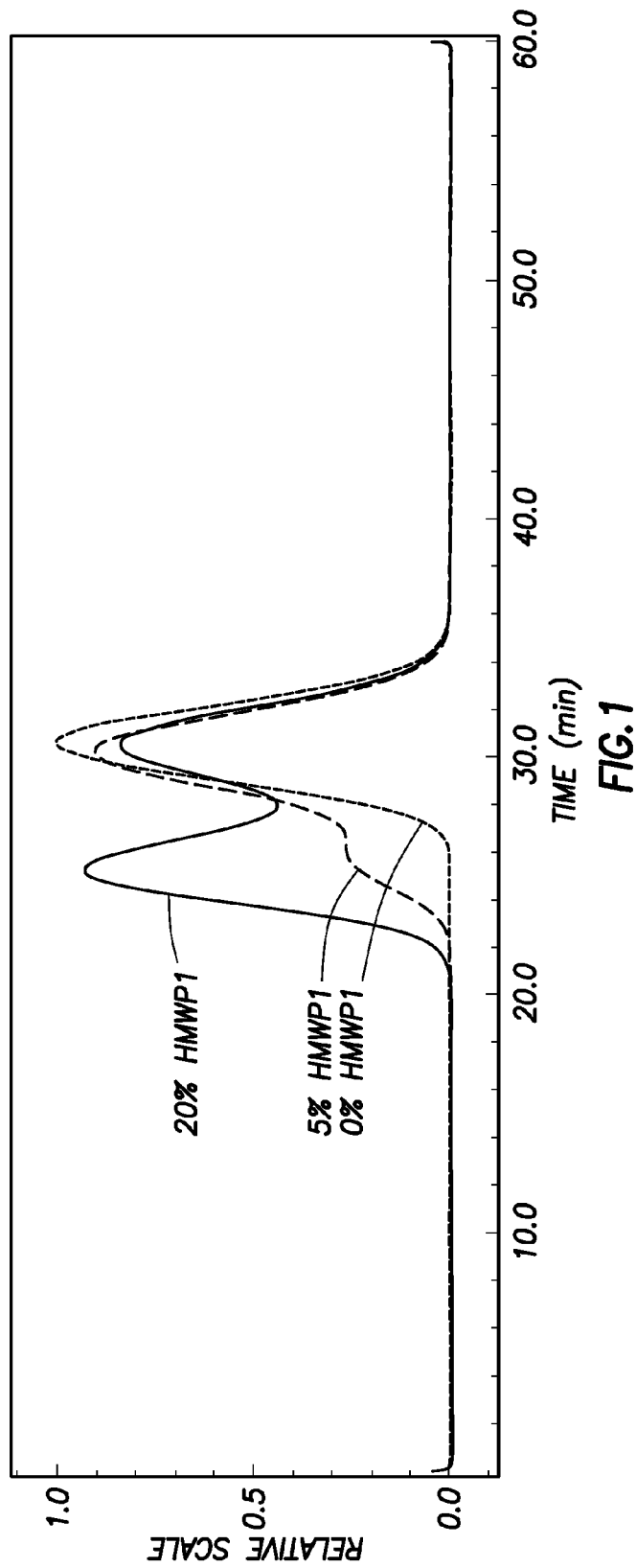
FIG. 1 shows a gel permeation chromatogram for polymer mixtures containing a low molecular weight partially hydrolyzed polyacrylamide base polymer and variable amounts of a high molecular weight partially hydrolyzed polyacrylamide addend polymer.

The present disclosure relates to gellable treatment fluids, and, more specifically, to gellable treatment fluids and methods associated therewith, where the gel times and gel strengths of the treatment fluids may be modified by using a polymer mixture containing two or more polymers having disparate average molecular weights.

As used herein, a "treatment fluid" is a fluid that is placed in a subterranean formation in order to perform a desired function. Treatment fluids can be used in a variety of subterranean operations, including, but not limited to, drilling operations, production treatments, stimulation treatments, remedial treatments, fluid diversion operations, fracturing operations, secondary or tertiary enhanced oil recovery (EOR) operations, and the like. As used herein, the terms "treat," "treatment," "treating," and other grammatical equivalents thereof refer to any subterranean operation that uses a fluid in conjunction with performing a desired function and/or achieving a desired purpose. The terms "treat," "treatment," and "treating," as used herein, do not imply any particular action by the fluid or any particular component thereof unless otherwise specified. Treatment fluids can include, for example, drilling fluids, fracturing fluids, acidizing fluids, conformance treatment fluids, damage control fluids, remediation fluids, scale removal and inhibition fluids, chemical floods, and the like.

The treatment fluids of the various embodiments disclosed herein can provide many advantages when used for treating a subterranean formation. Without limitation, these advantages may include allowing reduced polymer concentrations to be used when forming a gel, and/or the opportunity to modulate the gel time and gel strength to a desired degree. As described herein, use of a polymer mixture in a treatment fluid may allow reduced polymer concentrations to be used to achieve a comparable result to that obtainable with a like treatment fluid containing only a single polymer. For example, to achieve a suitable gel time at low formation temperatures, undesirably high quantities of polymer may be required in some instances. In some cases, this difficulty can be overcome by using a polymer mixture in accordance with the embodiments described herein. Keeping total polymer quantities low while achieving a comparable result can provide lower cost treatments and a reduced environmental impact. Further, the ability to alter the gel time of a treatment fluid can reduce the amount of downtime in a treatment operation, thereby allowing production to resume sooner and potentially reducing treatment costs. In addition, the ability to alter the gel strength can potentially allow a gel to be tailored to suit a particular downhole application. For example, some subterranean treatment operations may be more suitably conducted with stiff, ringing gels, whereas other treatment operations may be more suitably conducted with deformable, lipping gels. In some embodiments, the gellable treatment fluids described herein may be particularly beneficial for at least partially blocking the flow of an aqueous fluid, such as water or an aqueous treatment fluid, in a subterranean formation. In other embodiments, the gellable treatment fluids described herein may be particularly suitable for transporting a particulate within the subterranean formation.

It has been discovered by the present inventors that a treatment fluid containing a mixture of two or more polymers having disparate average molecular weights may be used to modify the gel time of the treatment fluid. More specifically, it has been discovered that the inclusion of small quantities of an addend polymer in a larger quantity of a base polymer can desirably reduce the observed gel time when the quantity of base polymer is held constant. This result is surprising, since the observed gel time of the polymer mixture does not follow simple "law of mixtures" principles to produce a gel time that is intermediate between those of the individual polymers. Without being bound by theory or mechanism, it is believed that the base polymer and the addend polymer may synergistically interact with one another such that the addend polymer "enhances" the effective concentration of the base polymer, such that it may gel more quickly, such as when higher concentrations of the base polymer are used. A significant advantage of this approach is that the inclusion of small amounts of the addend polymer in the polymer mixture is not believed to significantly alter the viscosity of the treatment fluid, thereby not detrimentally impacting one's ability to introduce the treatment fluid into a subterranean formation. In contrast, at higher concentrations of the base polymer needed to obtain a comparable result to that seen by using a polymer mixture of the present embodiments, treatment fluid viscosity may become problematic and make its introduction into a subterranean formation more difficult.

Not only can a polymer mixture be used to desirably decrease the gel time of a treatment fluid, but the polymer mixture may also be used to modulate the gel strength. As noted previously, stiff, ringing gels are typically formed from lower molecular weight polymers (e.g., polymers having a molecular weight of about 1 million or less). As defined herein, the term "stiff gel" refers to a non-flowable gel that does not undergo substantial deformation when a container housing the gel is tipped through an angle of 45°-180°. When a container housing a stiff gel is tapped on a rigid surface, and the container exhibits a ringing response like a tuning fork, the gel is then defined as a "ringing gel." In contrast, deformable, lipping gels are typically formed from higher molecular weight polymers. As defined herein, the term "lipping gel" (also referred to as "tonguing gel") refers to a deformable gel that does undergo deformation when a container housing the gel is tipped through an angle of 45°-90°. Deformation of such gels may take place by forming a "lip" or a "tongue" that can be retrieved into the container by returning the container back to its upright position. A polymer mixture containing a low molecular weight base polymer and a high molecular weight addend polymer may allow a gel to be more deformable than would otherwise be possible with a low molecular weight base polymer alone. Likewise, use of a high molecular weight base polymer and a low molecular weight addend polymer may allow a lipping gel to be more rigid than would otherwise be possible with a high molecular weight base polymer alone.

It is a further advantage of the present embodiments that the gel time of a base polymer may be lowered by using either a lower or a higher molecular weight addend polymer, provided that the molecular weight separation between the base polymer and the addend polymer is sufficient. Presently, greater reductions in gel times are seen when a high molecular weight addend polymer is added to a low molecular weight base polymer. However, a more modest lowering of the gel time may also still occur when a low molecular weight addend polymer is added to a high molecular weight base polymer. Without being bound by theory or mechanism, it is believed that larger reductions in the gel time occur when the molecular weight separation between the addend polymer and the base polymer is greater. For the base polymers and addend polymers studied thus far, a larger separation of average polymer molecular weights and higher quantities of addend polymer may be preferred when a low molecular weight addend polymer is added to a higher molecular weight base polymer than when the molecular weights are reversed.

Still without being limited by theory or mechanism, it is believed that the impact of polymer molecular weights on gel times may take place in the following manner. It is believed that gel formation takes place during crosslinking after the apparent molecular weight of the crosslinked polymer, and by inference the polymer chain dimension, reaches a critical value. This critical molecular weight value may be reached more readily for higher molecular weight polymers at lower extents of crosslinking, even when the higher molecular weight polymers are present in low concentrations. Lower molecular weight polymers, in contrast, may need a higher extent of crosslinking and greater polymer concentration to reach the critical molecular weight value. When a polymer mixture comprising a higher molecular weight addend polymer and a lower molecular weight base polymer is gelled, it is believed that the critical molecular weight value is reached more rapidly due to the presence of the higher molecular weight polymer. In contrast, when a lower molecular weight addend polymer is mixed with a higher molecular weight base polymer, the lower molecular weight addend polymer may be less able to influence the gel time. Generally, the base polymer and the addend polymer are crosslinkable using the same crosslinking chemistry and the same crosslinking agent.

Although the gellable treatment fluids described herein may find particular utility in conformance control applications, it is to be understood that the treatment fluids may be used in any type of downhole treatment operation, particularly treatment operations involving the transport of particulates. The gellable treatment fluids described herein may be used in any of the drilling stage, the production stage, the stimulation stage, EOR operations, or the remediation stage of a subterranean operation. In addition to conformance control applications, illustrative treatment operations in which the gellable treatment fluids may be used include, for example, fracturing operations, gravel packing operations, and stimulation operations, such as acidizing operations. Any of these operations may benefit from a reduction in produced water or decreased formation permeability, for example, in addition to the benefits of forming a gel in the subterranean formation.

As used herein, the term "polymer mixture" refers to a combination of two or more polymers.

As used herein, the term "base polymer" refers to a major polymer component that is present in a polymer mixture in an amount of greater than 50%.

As used herein, the term "addend polymer" refers to a minor polymer component that is present in a polymer mixture in an amount of less than 50%.

As used herein, the term "crosslinking agent" refers to a compound that is capable of forming intermolecular crosslinks with a base polymer and/or an addend polymer of a polymer mixture. Illustrative crosslinking agents can include organic crosslinking agents and transition metal ions, for example. Transitions metal ions, when used in the capacity of a crosslinking agent, will be referred to herein as an "inorganic crosslinking agent." As used herein, the term "organic crosslinking agent" refers to an organic compound that is capable of forming intermolecular crosslinks with a base polymer and/or an addend polymer of a polymer mixture. No particular mechanism of crosslinking is to be implied by use of the term "crosslinking agent."

As used herein, polymers comprising an acrylamide monomer unit or a derivative thereof refer to homopolymers or copolymers of these monomer units. As used herein, the term "derivative" refers to a monomer unit that is structurally related to acrylamide but has one or more atoms therein replaced with other atoms. Illustrative acrylamide derivatives that may be used in the embodiments described herein include, for example, methacrylamide, acrylic acid and esters thereof, and methacrylic acid and esters thereof. Homopolymers used in the embodiments described herein can comprise acrylamide or methacrylamide monomer units. Copolymers used in the embodiments described herein can comprise acrylamide or methacrylamide monomer units and at least one other monomer unit, particularly an acrylamide derivative. Illustrative polymers comprising an acrylamide monomer unit or a derivative thereof can include polyacrylamide, polymethacrylamide, acrylamide copolymers, methacrylamide copolymers, and partially hydrolyzed variants thereof. More specific examples of polymers comprising an acrylamide monomer unit or a derivative thereof are considered in more detail below.

As used herein, the term "average molecular weight" refers to any descriptor of a polymer's mean molecular weight. As one of ordinary skill in the art will recognize, there are several different average molecular weight descriptors that may be used to characterize the molecular weight of polymers. Any of the number average molecular weight ($M_n$), peak average molecular weight ($M_p$), weight average molecular weight ($M_w$), or the Z average molecular weight ($M_z$) may be used to characterize the polymers utilized herein. These average molecular weight descriptors, techniques for determining the molecular weight descriptors, and the differences therebetween will be readily apparent to one having ordinary skill in the art. As one of ordinary skill in the art will additionally recognize, depending on the average molecular weight descriptor used, a polymer's molecular weight can vary. Further, the ratio of two polymers' average molecular weights can vary depending on which average molecular weight descriptor is used. Accordingly, in order to best compare the average molecular weights of two polymers, the same molecular weight descriptor should be used for making the comparison.

In some embodiments, the gellable treatment fluids described herein may comprise an aqueous carrier fluid as a continuous phase of the fluids. Aqueous carrier fluids may include, for example, fresh water, acidified water, salt water, seawater, brine (e.g., a saturated salt solution), or an aqueous salt solution (e.g., a non-saturated salt solution). In some embodiments, the gellable treatment fluids may also comprise small amounts of hydrocarbons such that the aqueous carrier fluid still remains as the treatment fluid's continuous phase. The small amounts of hydrocarbons can be introduced from any source. For example, some of the polymers suitable for use in the present embodiments may be obtained as an emulsion in a hydrocarbon base fluid, such as oil. It is not believed that small amounts of hydrocarbons, when present, significantly impact the treatment fluid's performance in forming a gel.

In some embodiments, the gellable treatment fluids described herein may comprise an aqueous salt solution as their continuous phase. Such aqueous salt solutions can have a salt concentration ranging between about 0.1% and about 10% by weight. The salt concentration can range between about 1% and about 10% by weight in some embodiments, between about 1% and about 3% by weight in other embodiments, or between about 2% and about 5% by weight in still other embodiments.

In some embodiments, gellable treatment fluids described herein can comprise a crosslinking agent and a polymer mixture comprising a base polymer and an addend polymer. The base polymer and the addend polymer of the polymer mixture can each comprise an acrylamide monomer unit or a derivative thereof and have different average molecular weights, such that a molecular weight distribution of the polymer mixture contains at least two local maxima. That is, according to such embodiments, the molecular weight distribution of the polymer mixture may be bimodal or have a higher modality. In some embodiments, the crosslinking agent can comprise a transition metal ion or an organic crosslinking agent, such as a crosslinking polymer, for example.

In some embodiments, gellable treatment fluids described herein may contain a polymer mixture in which the base polymer has a lower average molecular weight than the addend polymer. In some such embodiments, the base polymer may have an average molecular weight of about 200,000 or less, and the addend polymer may have an average molecular weight of about 1,000,000 or more. As described above, there may be a reduction in gel times for the treatment fluids when the base polymer and the addend polymer are more widely separated in average molecular weight. When a higher molecular weight addend polymer is added to a lower molecular weight base polymer, there may be more tolerance for a lower average molecular weight separation. When a higher molecular weight addend polymer is used, a sufficient separation in average molecular weight may comprise an average molecular weight ratio of the addend polymer to the base polymer of at least about 5:1 in some embodiments. In some embodiments, a suitable average molecular weight ratio may be at least about 7:1, or at least about 8:1, or at least about 9:1, or at least about 10:1, or at least about 11:1, or at least about 12:1, or at least about 13:1, or at least about 14:1, or at least about 15:1. Suitable concentrations of the base polymer and the addend polymer in such embodiments will be determined by a number of factors including, for example, the desired gel time and gel strength, the desired treatment fluid viscosity, and the formation temperature and chemistry. In various embodiments, a suitable amount of total polymer in the treatment fluid can range between about 0.5% and about 15% by weight of the treatment fluid. In some embodiments, a suitable amount of total polymer in the treatment fluid can range between about 1% and about 10% by weight of the treatment fluid.

In some embodiments, gellable treatment fluids described herein may comprise a crosslinking agent and a polymer mixture where the polymer mixture comprises a base polymer and an addend polymer in which the base polymer and the addend polymer each comprise an acrylamide monomer unit or a derivative thereof, and an average molecular weight ratio of the addend polymer to the base polymer is at least about 5:1. In various embodiments, the crosslinking agent may comprise a transition metal ion or an organic crosslinking agent, such as a crosslinking polymer, for example.

In some embodiments, gellable treatment fluids described herein may comprise a crosslinking agent and a polymer mixture where the polymer mixture comprises a base polymer and an addend polymer in which the base polymer and the addend polymer each comprise an acrylamide monomer unit or a derivative thereof, and an average molecular weight ratio of the addend polymer to the base polymer is at least about 7:1. In various embodiments, the crosslinking agent may comprise a transition metal ion or an organic crosslinking agent, such as a crosslinking polymer, for example.

In some embodiments, gellable treatment fluids described herein may comprise an organic crosslinking agent and a polymer mixture where the polymer mixture comprises a base polymer and an addend polymer in which the base polymer and the addend polymer each comprise an acrylamide monomer unit or a derivative thereof and an average molecular weight ratio of the addend polymer to the base polymer is at least about 9:1. In various embodiments, the crosslinking agent may comprise a transition metal ion or an organic crosslinking agent, such as a crosslinking polymer, for example.

In other embodiments, gellable treatment fluids described herein may contain a polymer mixture in which the base polymer has a higher average molecular weight than the addend polymer. In some such embodiments, the base polymer may have an average molecular weight of about 1,000,000 or more, and the addend polymer may have an average molecular weight of about 200,000 or less. In some such embodiments, the base polymer may have an average molecular weight of about 10,000,000 or more, and the addend polymer may have an average molecular weight of about 200,000 or less. As described above, although the reduction in gel time may be less dramatic when a low molecular weight addend polymer is added to a high molecular weight base polymer, some reduction of the gel time may still be realized when the average molecular weight separation is sufficiently large. When a low molecular weight addend polymer is added to a high molecular weight base polymer, suitable molecular weight ratios of the base polymer to the addend polymer may include those set forth above, in some embodiments. In other embodiments, when a low molecular weight addend polymer is added to a high molecular weight base polymer, a suitable average molecular weight separation may comprise an average molecular weight ratio of the base polymer to the addend polymer of at least about 100:1 in some embodiments. In some embodiments, a suitable average molecular weight ratio may be at least about 120:1, or at least about 140:1, or at least about 160:1, or at least about 180:1, or at least about 200:1, or at least about 220:1, or at least about 240:1, or at least about 260:1, or at least about 280:1, or at least about 300:1. Again, suitable concentrations of the base polymer and the addend polymer in such embodiments will be determined by a number of factors including, for example, the desired gel time and gel strength, the desired treatment fluid viscosity, and the formation temperature and chemistry. In various embodiments, a suitable amount of total polymer in the treatment fluid can range between about 0.5% and about 15% by weight of the treatment fluid. In some embodiments, a suitable amount of total polymer in the treatment fluid can range between about 1% and about 10% by weight of the treatment fluid.

In some embodiments, the base polymer and the addend polymer may be present in sufficient amounts and their average molecular weights may be sufficiently separated to produce a bimodal or higher modality molecular weight distribution of the polymer mixture. That is, in some embodiments, there may be two or more local maxima within the molecular weight distribution of the polymer mixture. Methods for assaying the molecular weight distribution of a polymer mixture, such as gel permeation chromatography and other related techniques, will be familiar to one having ordinary skill in the art. Two or more local maxima may be observed when the average molecular weights of the addend polymer and the base polymer are more separated from one another and/or when higher quantities of the addend polymer are present. For example, if the addend polymer is only present in a small amount in the polymer mixture and/or if its average molecular weight is not well separated from that of the base polymer, the molecular weight distribution may show a shoulder on the molecular weight distribution curve rather than a second local maximum. Conversely, if the addend polymer is present in higher amounts in the polymer mixture, two local maxima may be observable even if the average molecular weights are not well separated from one another. Likewise, if the average molecular weights are well separated from one another, a second local maximum may be observable even if only a small quantity of the addend polymer is present in the polymer mixture.

According to the present embodiments, the base polymer and the addend polymer each have different average molecular weights. In some embodiments, the base polymer and the addend polymer can each comprise the same polymer backbone, but with the polymers having different chain lengths. Thus, in such embodiments, the polymers can be chemically identical except in the aspect of their average molecular weights. In some embodiments, the base polymer and the addend polymer can also differ from one another in at least one aspect other than their average molecular weights. That is, in such embodiments, the polymers can be chemically distinct from one another. Illustrative examples of chemical distinctness in an aspect can include, without limitation, incorporation of at least some different monomers in the polymer chain, differing degrees of hydrolysis, and the like. For example, in some embodiments, the base polymer and the addend polymer can each comprise a partially hydrolyzed polyacrylamide polymer, where each polymer has a different average molecular weight and the degree of hydrolysis of the polymers may optionally be different. In some embodiments, at least one of the base polymer or the addend polymer may comprise at least some monomer units that are not crosslinkable. Illustrative examples of non-crosslinkable monomers that may be suitable for use in the present embodiments include, for example, 2-acrylamido-2-methyl-propanesulfonic acid, vinylpyrrolidone, N,N-dimethylacrylamide, and the like. Other non-crosslinkable monomers can be envisioned by one having ordinary skill in the art.

In the gellable treatment fluids described herein, the total polymer concentration, the base polymer concentration, the addend polymer concentration, and the organic crosslinking agent concentration may vary over a wide range. As described above, the concentrations of the base polymer and the organic crosslinking agent may produce a starting point for the gel time to be modified with the addend polymer. Choice of the addend polymer concentration may be dictated by the needed reduction in the gel time. Additionally, viscosity concerns associated with introducing the treatment fluid into a subterranean formation may further dictate the total polymer concentration, the base polymer concentration, the addend polymer concentration, and/or the organic crosslinking agent concentration in the treatment fluids.

In various embodiments, the addend polymer may be present in the gellable treatment fluids described herein in an amount ranging between about 0.1% and less than 50% of the polymer mixture by weight. In some embodiments, such concentrations may introduce bimodality or higher modality in the molecular weight distribution of the polymer mixture, depending on the separation of average molecular weights. As noted above, a primary factor in choosing the amount of addend polymer is reducing the gel time and/or modulating the gel strength to a desired degree. As the gel time may be dependent on the temperature at which the treatment fluid is gelled, choice of the amount of addend polymer may also be selected to compensate for the formation temperature in some embodiments. Another consideration in choosing the amount of addend polymer to include in the polymer mixture is ensuring that the gellable treatment fluid does not become overly viscous due to a high total polymer content. In some embodiments, the gellable treatment fluids described herein may have a viscosity of about 500 cP or less. At these viscosity levels, the treatment fluids may remain readily pumpable for introduction into a subterranean formation. In some embodiments, the gellable treatment fluids may have a viscosity of about 300 cP or less or about 200 cP or less. In still other embodiments, the gellable treatment fluids may have a viscosity ranging between about 50 cP and about 200 cP or between about 100 cP and about 250 cP.

In some embodiments, the addend polymer may comprise between about 0.1% and about 25% of the polymer mixture by weight. In some embodiments, the addend polymer may comprise between about 0.5% and about 40% of the polymer mixture by weight, or between about 0.5% and about 30% of the polymer mixture by weight, or between about 0.5% and about 20% of the polymer mixture by weight, or between about 0.5% and about 15% of the polymer mixture by weight, or between about 0.5% and about 10% of the polymer mixture by weight, or between about 1% and about 40% of the polymer mixture by weight, or between about 1% and about 30% of the polymer mixture by weight, or between about 1% and about 20% of the polymer mixture by weight, or between about 1% and about 15% of the polymer mixture by weight, or between about 1% and about 10% of the polymer mixture by weight, or between about 2% and about 40% of the polymer mixture by weight, or between about 2% and about 30% of the polymer mixture by weight, or between about 2% and about 20% of the polymer mixture by weight, or between about 2% and about 15% of the polymer mixture by weight, or between about 2% and about 10% of the polymer mixture by weight.

In some embodiments, the gellable treatment fluids described herein may have a reduced gel time relative to a like gellable treatment fluid having the same concentration of the base polymer. As used herein, the term "like gellable treatment fluid" refers to a second treatment fluid having substantially the same composition as that of a first treatment fluid, with the exception of one treatment fluid lacking an addend polymer. It is to be noted that inert components that do not substantially affect the gel time can also be present in a "like gellable treatment fluid." In some embodiments, the gellable treatment fluids described herein may have a reduced gel time relative to a like gellable treatment fluid that has the same total concentration of polymer. That is, in such embodiments, the total polymer quantity (i.e., base polymer+addend polymer acting synergistically with one another) may produce a shorter gel time than an equivalent quantity of the base polymer alone.

In some embodiments, the gellable treatment fluids described herein can comprise an inorganic crosslinking agent, such as a transition metal ion or a main group metal ion. In some embodiments, suitable sources of transition metal ions and main group metal ions can include inorganic salts such as, for example, aluminum salts (e.g., aluminum sulfate and aluminum phosphate), chromium salts (e.g., chromium acetate and chromium propionate), and the like. In some embodiments, the transition metal ions or main group metal ions may be complexed with additional chelating or non-chelating ligands. Illustrative transition metal ions that may be suitable for crosslinking and contain a chelating or non-chelating ligand include, for example, zirconium or titanium ions that have been complexed with ligands such as lactate or alkanolamines (e.g., ethanolamine, triethanolamine, and the like).

In various embodiments, the gellable treatment fluids described herein can comprise an organic crosslinking agent. In some embodiments, the organic crosslinking agent can comprise a crosslinking polymer. In some embodiments, suitable crosslinking polymers can include, for example, polyalkyleneimines and polyalkylenepolyamines, any derivative thereof, any salt thereof, and any combination thereof. In more specific embodiments, suitable crosslinking polymers can include, for example, polyethyleneimine, polyvinylamine (polyethylenepolyamine), any derivative thereof, any salt thereof, and any combination thereof. In alternative embodiments, suitable crosslinking polymers may include, for example, polypropyleneimine, polypropylenepolyamine, polyallylamine, any derivative thereof, any salt thereof, and any combination thereof. In yet other alternative embodiments, the organic crosslinking agent may include amine-containing biopolymers such as, for example, chitosan, polymyxins, polylysine, any derivative thereof, any salt thereof, and any combination thereof.

In various embodiments, the base polymer and the addend polymer of the present gellable treatment fluids can each comprise an acrylamide monomer unit or a derivative thereof. In some embodiments, the base polymer and the addend polymer may be water-soluble. In some embodiments, the base polymer and the addend polymer of the gellable treatment fluids may each comprise an acrylamide monomer unit. Such polymers can include, for example, polyacrylamide, acrylamide copolymers, and partially hydrolyzed variants thereof. In some embodiments, the corresponding methacrylamide polymers or copolymers or acrylamide/methacrylamide copolymers may be used. In some embodiments, the base polymer or the addend polymer may comprise a polymer comprising an acrylamide monomer unit and the other polymer may comprise a methacrylamide monomer unit. That is, in some embodiments, mixtures of acrylamide-containing polymers and methacrylamide-containing polymers may be used.

In some embodiments, a polymer comprising an acrylamide monomer unit or a derivative thereof may be a partially hydrolyzed polyacrylamide, a partially hydrolyzed polymethacrylamide, or a salt thereof. Suitable salt forms for the corresponding acrylic acid or methacrylic acid monomer units can include, for example, alkali metal salts (e.g., lithium, sodium, or potassium salts) or ammonium ($NH_4^+$) salts. Such polymers may be used as the base polymer and/or the addend polymer in the present embodiments. As used herein, a partially hydrolyzed polyacrylamide or partially hydrolyzed polymethacrylamide has at least a portion of its side chain amide groups hydrolyzed to carboxylic acids. In some embodiments, a partially hydrolyzed polyacrylamide or partially hydrolyzed polymethacrylamide may have up to about 30% of its side chain amide groups hydrolyzed to carboxylic acids. In some embodiments, a partially hydrolyzed polyacrylamide or partially hydrolyzed polymethacrylamide may have up to about 20% of its side chain amide groups hydrolyzed to carboxylic acids. In some embodiments, a partially hydrolyzed polyacrylamide or partially hydrolyzed polymethacrylamide may have up to about 10% of its side chain amide groups hydrolyzed to carboxylic acids. In some embodiments, a partially hydrolyzed polyacrylamide or partially hydrolyzed polymethacrylamide may have up to about 5% of its side chain amide groups hydrolyzed to carboxylic acids. In some embodiments, a partially hydrolyzed polyacrylamide or partially hydrolyzed polymethacrylamide may have up to about 2% of its side chain amide groups hydrolyzed to carboxylic acids. In some embodiments, a partially hydrolyzed polyacrylamide or partially hydrolyzed polymethacrylamide may have up to about 1% of its side chain amide groups hydrolyzed to carboxylic acids. A number of partially hydrolyzed polyacrylamides having a variety of molecular weights and degrees of hydrolysis are known in the art and can be used in the various embodiments described herein, as discussed in further detail hereinafter.

In some embodiments, a copolymer containing an acrylamide monomer unit may be used in the gellable treatment fluids described herein. Such copolymers may be used as the base polymer and/or the addend polymer in the present embodiments. In some embodiments, the copolymer may be a copolymer of acrylamide and an acrylate ester. In more specific embodiments, the copolymer may be a copolymer of acrylamide and t-butyl acrylate. One example of such a copolymer that may be used in the present embodiments has a weight average molecular weight ($M_w$) of about 107,000, which is available from Halliburton Energy Services under the tradename "HZ-10™." In alternative embodiments, copolymers of acrylamide and/or methacrylamide with monomers such as, for example, ethylene, propylene, styrene, maleic anhydride, 2-acrylamido-2-methylpropanesulfonic acid, vinylpyrrolidone, N,N-dimethylacrylamide, and the like, may be used in the gellable treatment fluids described herein. Such polymers can also be partially hydrolyzed and available in a range of molecular weights.

In some embodiments, at least one of the base polymer or the addend polymer may comprise a partially hydrolyzed polyacrylamide or a copolymer of acrylamide and t-butyl acrylate. In some embodiments, both the base polymer and the addend polymer may comprise a partially hydrolyzed polyacrylamide. In some embodiments, the base polymer may comprise a copolymer of acrylamide and t-butyl acrylate, and the addend polymer may comprise a partially hydrolyzed polyacrylamide. In some embodiments, the base polymer may comprise a partially hydrolyzed polyacrylamide, and the addend polymer may comprise a copolymer of acrylamide and t-butyl acrylate.

As previously noted, the rate of gel formation can be impacted by the temperature of a subterranean formation in which gellation takes place. In some embodiments, a polymer that produces an acceptable gel time at lower formation temperatures can gel at an unacceptably fast rate at higher temperatures. Conversely, a polymer that gels at an acceptable rate at higher formation temperatures may not gel at an acceptable rate, if at all, at lower formation temperatures. For conventional conformance control treatments using the specific polymers set forth above (i.e., without an addend polymer) in combination with polyethyleneimine as an organic crosslinking agent, a copolymer of acrylamide and t-butyl acrylate is typically used when the temperature of the subterranean formation is about 160° F. or higher, whereas a partially hydrolyzed polyacrylamide is typically used when the subterranean formation has a temperature ranging between about 60° F. and about 160° F. It is believed that use of an addend polymer according to the present embodiments may allow the preferred effective working temperature ranges to be extended for at least some of the foregoing base polymers.

In some embodiments, the gellable treatment fluids described herein may have gel strengths that differ from a like gellable treatment fluid that lacks the addend polymer. For example, in some embodiments, it may be possible to increase the deformability of a stiff, ringing gel into more of a lipping-type gel through the addition of a high molecular weight addend polymer to a low molecular weight base polymer, or to increase the stiffness of a deformable, lipping gel to more of a ringing-type gel through the addition of a low molecular weight addend polymer to a high molecular weight base polymer.

In some embodiments, the gellable treatment fluids described herein may further comprise at least one gel time modifier. Use of a gel time modifier may allow further adjustments of the gel time to be realized. Gel time modifiers may be used if a sufficient reduction in gel time cannot be realized through use of the addend polymer alone and/or if the treatment fluid viscosity becomes too great at increased polymer concentrations, for example. Suitable gel time modifiers may be gel time accelerators in some embodiments or gel time retarders in other embodiments, depending on whether one wants to increase or decrease the gel time for a particular application.

In some embodiments, suitable gel time modifiers for use in combination with organic crosslinking agents can include, for example, pH-modifying agents such as, for example, inorganic acids, organic acids, organic salts, and inorganic salts. Examples of such gel time modifiers are set forth in U.S. Pat. Nos. 7,331,390, 7,325,613, 7,322,414, and 7,287,587, and co-pending U.S. patent application Ser. Nos. 12/716,951, 12/716,979 and 12/717,004, all filed on Mar. 3, 2010 and now available as U.S. Patent Application Publications 2011/0214865, 2011/0214866 and 2011/0214867, respectively. The foregoing patents and patent application publications are hereby incorporated by reference in their entirety. Specific illustrative examples of pH-modifying agents can include, for example, alkali metal carbonates, bicarbonates, acetates, formates, and hydroxides; organic acids (e.g., phenols and acetic acid); mineral acids (e.g., hydrochloric acid); and Lewis acids (e.g., boric acid). Illustrative gel time retarders that may be used in the present embodiments include, for example, transition metal salts that can coordinate the organic crosslinking agent and acid anhydrides that can at least partially acylate amino groups in the organic crosslinking agent. A suitable coordinated organic crosslinking agent is described in commonly owned U.S. Pat. No. 6,196,317, which is incorporated herein by reference in its entirety. The use of acid anhydrides as a gel time retarder is described in commonly owned U.S. Pat. No. 7,091,160, which is incorporated herein by reference in its entirety.

In some embodiments, organic acids may be used as a gel time retarder in combination with inorganic crosslinking agents, specifically transition metal ions or main group metal ions. For example, in the case of a $Cr^{3+}$ crosslinking agent (e.g., $Cr^{3+}$ propionate), acetic acid may be used as a gel time retarder.

In some or other embodiments, a suitable gel time modifier for use in combination with an organic crosslinking agent may comprise a quaternary ammonium compound. Use of quaternary ammonium compounds for modifying the gel time of a gellable treatment fluid is described in commonly owned U.S. patent application Ser. No. 13/171,677, filed on Jun. 29, 2011 and now available as U.S. Patent Application Publication 2013/0000911, which is incorporated herein by reference in its entirety. In brief, suitable quaternary ammonium compounds may include tetraalkylammonium salts. Illustrative tetraalkylammonium salts that may be suitable for use in the present embodiments can include, without limitation, tetramethylammonium halides, tetraethylammonium halides, tetrapropylammonium halides, tetrabutylammonium halides, mixtures thereof, and the like. The alkyl groups in the tetraalkylammonium salts can be either straight chain or branched. In some embodiments, the alkyl groups can be the same, and in other embodiments they can be different. Some examples of tetraalkylammonium salts that comprise different alkyl groups are described in U.S. Pat. No. 4,842,073, which is incorporated herein by reference in its entirety. In some embodiments, the tetraalkylammonium salt can comprise tetramethylammonium chloride. Although it is believed that tetraalkylammonium salts having any carbon chain length can be used in the present embodiments, it is believed that smaller alkyl groups (i.e., $\geq C_4$ alkyl groups) are preferred. In some embodiments, however, tetraalkylammonium salts that have at least one alkyl group larger than a $C_4$ alkyl group can also be used.

In some or other embodiments, a suitable gel time modifier for use in combination with an organic crosslinking agent may comprise an amino alcohol, an oligomeric polyamine having a molecular weight of less than about 400, any salt thereof, any derivative thereof, and any combination thereof. Use of the preceding compounds as gel time modifiers is described in commonly owned U.S. patent application Ser. No. 13/171,718, filed on Jun. 29, 2011 and now available as U.S. Patent Application Publication 2013/0000905, which is incorporated herein by reference in its entirety. Specific examples of amino alcohols that may be suitable for use in the present embodiments can include, for example, ethanolamine, diethanolamine, triethanolamine, propanolamine, any salt thereof, any derivative thereof, and any combination thereof. Specific examples of oligomeric polyamines that may be suitable for use in the present embodiments can include, for example, diethylenetriamine, triethylenetetraamine, tetraethylenepentaamine, any salt thereof, any derivative thereof, and any combination thereof. It is particularly surprising that amino alcohols and low molecular weight polyamines (i.e., polyamines having a molecular weight of less than about 400) can promote gellation, since they have considerably fewer amino groups than the polymeric organic crosslinking agents of the present embodiments and would accordingly be anticipated to crosslink to a lesser degree as a result. Furthermore, depending on their concentration in a treatment fluid, among other factors, amino alcohols and oligomeric polyamines may either reduce or increase the gel time of the gellable treatment fluid.

In further embodiments, the gellable treatment fluids described herein may optionally further comprise any number of additional additives commonly used in treatment fluids including, for example, anti-oxidants, polymer degradation prevention additives, relative permeability modifiers, scale inhibitors, corrosion inhibitors, foaming agents, defoaming agents, antifoam agents, emulsifying agents, de-emulsifying agents, iron control agents, proppants or other particulates, particulate diverters, salts, acids, fluid loss control additives, gas, catalysts, clay control agents, dispersants, flocculants, scavengers (e.g., $H_2S$ scavengers, $CO_2$ scavengers or $O_2$ scavengers), lubricants, breakers, friction reducers, bridging agents, viscosifiers, weighting agents, solubilizers, pH control agents (e.g., buffers), hydrate inhibitors, consolidating agents, bactericides, and the like. Combinations of these additives can be used as well.

In some embodiments, the preceding treatment fluids may be used in subterranean treatment operations. Such treatment operations can vary widely in scope and may include, for example, drilling operations, stimulation operations, remediation operations, and the like. In some embodiments, the gellable treatment fluids may be used to form a gel in the subterranean formation that at least partially blocks the flow of an aqueous fluid therein. For example, in some embodiments, the treatment fluids may be used to form a gel that at least partially blocks the flow of water in the subterranean formation. At least partially blocking the flow of water can reduce the production of water from the subterranean formation and/or allow less permeable zones of the subterranean formation to be treated with an aqueous treatment fluid, for example. That is, in some embodiments, use of the treatment fluids in a subterranean formation may result in reduction of the permeability of at least a portion of the subterranean formation to water or another aqueous fluid.

In some embodiments, methods described herein can comprise: providing a gellable treatment fluid that comprises: a polymer mixture comprising a base polymer and an addend polymer, the base polymer and the addend polymer each comprising an acrylamide monomer unit or a derivative thereof and having different average molecular weights, such that a molecular weight distribution of the polymer mixture contains at least two local maxima; and an organic crosslinking agent; introducing the gellable treatment fluid into a subterranean formation; and allowing the gellable treatment fluid to form a gel in the subterranean formation.

In some embodiments, methods described herein can comprise: providing a gellable treatment fluid that comprises: a polymer mixture comprising a base polymer and an addend polymer, the base polymer and the addend polymer each comprising an acrylamide monomer unit or a derivative thereof; wherein an average molecular weight ratio of the addend polymer to the base polymer is at least about 7:1; and an organic crosslinking agent; introducing the gellable treatment fluid into a subterranean formation; allowing the gellable treatment fluid to form a gel in the subterranean formation; and at least partially blocking the flow of an aqueous fluid in the subterranean formation with the gel.

To facilitate a better understanding of the present invention, the following examples of preferred embodiments are given. In no way should the following examples be read to limit, or to define, the scope of the invention.

EXAMPLES

The following polymers were used in the examples that follow: a low molecular weight partially hydrolyzed polyacrylamide containing at least 90 mole % acrylamide monomer units (Low Molecular Weight Polymer 1—LMWP1); a low molecular weight acrylamide/t-butyl acrylate copolymer containing at least 90 mole % acrylamide monomer units (Low Molecular Weight Polymer 2—LMWP2); a high molecular weight partially hydrolyzed polyacrylamide with a hydrolysis level of about 5% (High Molecular Weight Polymer 1—HMWP1); a high molecular weight partially hydrolyzed polyacrylamide with a hydrolysis level of less than about 1% (High Molecular Weight Polymer 2—HMWP2); and a high molecular weight partially hydrolyzed polyacrylamide with a hydrolysis level of 7-8% (High Molecular Weight Polymer 3—HMWP3). Available molecular weight data for some of these polymers is presented in Table 1 below. The sources of LMWP1 and LMWP2 were "HZ-30™" and "HZ-10™," respectively, each of which is available from Halliburton Energy Services. The source of HMWP1 was "MA-22™," which is available from Halliburton Energy Services. The source of HMWP3 was "A90L," which is a 50% polymer emulsion in oil that is available from BASF (Germany). HMWP2 is an experimental polymer that is available from WSP Chemicals and Technology (Philadelphia, Pa.). As indicated in the examples below, the crosslinking agent was either "HZ-20™," a polyethyleneimine polymer that is available from Halliburton Energy Services or "MA-17™," a liquid solution of $Cr^{3+}$ propionate that is available from Halliburton Energy Services.

TABLE 1

| Polymer | $M_n$ | $M_p$ | $M_w$ | $M_z$ |
|---|---|---|---|---|
| LMWP1 | $8.75 \times 10^4$ | $1.25 \times 10^5$ | $1.45 \times 10^5$ | $2.12 \times 10^5$ |
| LMWP2 | $5.46 \times 10^4$ | $6.83 \times 10^4$ | $1.07 \times 10^5$ | $2.82 \times 10^5$ |
| HMWP1 | $9.45 \times 10^5$ | $1.17 \times 10^6$ | $1.15 \times 10^6$ | $1.40 \times 10^6$ |

TABLE 1-continued

| Polymer | $M_n$ | $M_p$ | $M_w$ | $M_z$ |
|---|---|---|---|---|
| HMWP2 | — | — | — | — |
| HMWP3 | — | — | $5 \times 10^6$ | — |

Table 2 shows a comparison of the molecular weight ratios for some of the various low molecular weight and high molecular weight polymers used in the examples.

TABLE 2

| | HMW $M_n$/ LMW $M_n$ | HMW $M_p$/ LMW $M_p$ | HMW $M_w$/ LMW $M_w$ | HMW $M_z$/LMW $M_z$ |
|---|---|---|---|---|
| HMWP1/ LMWP1 | 10.8 | 9.4 | 7.9 | 6.6 |
| HMWP1/ LMWP2 | 17.3 | 17.1 | 10.7 | 5.0 |
| HMWP3/ LMWP1 | — | — | 35 | — |
| HMWP3/ LMWP2 | — | — | 47 | — |

FIG. 1 shows a gel permeation chromatogram for polymer mixtures containing a low molecular weight partially hydrolyzed polyacrylamide (LMWP1) base polymer and variable amounts of a high molecular weight partially hydrolyzed polyacrylamide (HMWP1) addend polymer. Bovine serum albumin was used as a molecular weight reference standard. Under gel permeation chromatography conditions, the polymer having the higher molecular weight elutes first, since it is retained less by the chromatography medium. As shown in FIG. 1, even in the presence of as little as 5% HMWP1, there was evidence of bimodality in the chromatogram trace. At 20% HMWP1, the bimodality was even more pronounced, as two local maxima were clearly present in the chromatogram trace.

Example 1

Gel Times in Gellable Treatment Fluids Comprising a Polymer Mixture Having a High Molecular Weight Addend Polymer and a Low Molecular Weight Base Polymer and an Organic Crosslinking Agent Gellable treatment fluids were formulated as set forth in Table 3 below. The carrier fluid in each case was 2% aqueous KCl, and the organic crosslinking agent was 2 wt. % polyethyleneimine. For entries 1-12, gellation was conducted at 120° F. For entries 13-16, gellation was conducted at 140° F. Except as indicated in Table 3, the amount of base polymer was held constant. The amount of addend polymer was measured by both wt. % of the treatment fluid and relative to the amount of base polymer.

TABLE 3

| Entry | Base Polymer | Addend Polymer | Wt. % Base Polymer | Wt. % Addend Polymer | Wt. % Total Polymer | % Addend Polymer Relative to Base Polymer | Gel Time (Hr) |
|---|---|---|---|---|---|---|---|
| 1 (Control) | LMWP1 | — | 5.40 | 0.00 | 5.40 | 0.0 | 21.8 |
| 2 | LMWP1 | HMWP1 | 5.40 | 0.13 | 5.53 | 2.5 | 13.0 |
| 3 | LMWP1 | HMWP1 | 5.40 | 0.27 | 5.67 | 5.0 | 9.3 |
| 4 | LMWP1 | HMWP1 | 5.40 | 0.43 | 5.83 | 8.0 | 6.0 |

TABLE 3-continued

| Entry | Base Polymer | Addend Polymer | Wt. % Base Polymer | Wt. % Addend Polymer | Wt. % Total Polymer | % Addend Polymer Relative to Base Polymer | Gel Time (Hr) |
|---|---|---|---|---|---|---|---|
| 5 (Control) | — | HMWP1 | 0.00 | 0.43 | 0.43 | — | 56.0 |
| 6 (Control) | LMWP2 | — | 5.40 | 0.00 | 5.40 | 0.0 | 21.8 |
| 7 | LMWP2 | HMWP1 | 5.40 | 0.13 | 5.53 | 2.5 | 10.5 |
| 8 | LMWP2 | HMWP1 | 5.40 | 0.27 | 5.67 | 5.0 | 6.5 |
| 9 | LMWP2 | HMWP1 | 5.40 | 0.43 | 5.83 | 8.0 | 3.8 |
| 10 (Control) | LMWP2 | — | 5.67 | 0.00 | 5.67 | 0.0 | 23.3 |
| 11 (Control) | LMWP2 | — | 5.83 | 0.00 | 5.83 | 0.0 | 23.1 |
| 12 (Control) | — | HMWP1 | 0.00 | 0.43 | 0.43 | — | 56.0 |
| 13 (Control) | LMWP2 | — | 5.40 | 0.00 | 5.40 | 0.00 | 11.5 |
| 14 | LMWP2 | HMWP2 | 5.40 | 0.13 | 5.53 | 2.5 | 4.75 |
| 15 | LMWP2 | HMWP2 | 5.40 | 0.27 | 5.67 | 5.0 | 3.1 |
| 16 | LMWP2 | HMWP2 | 5.40 | 0.43 | 5.83 | 8.0 | 2.2 |

Figure 2:
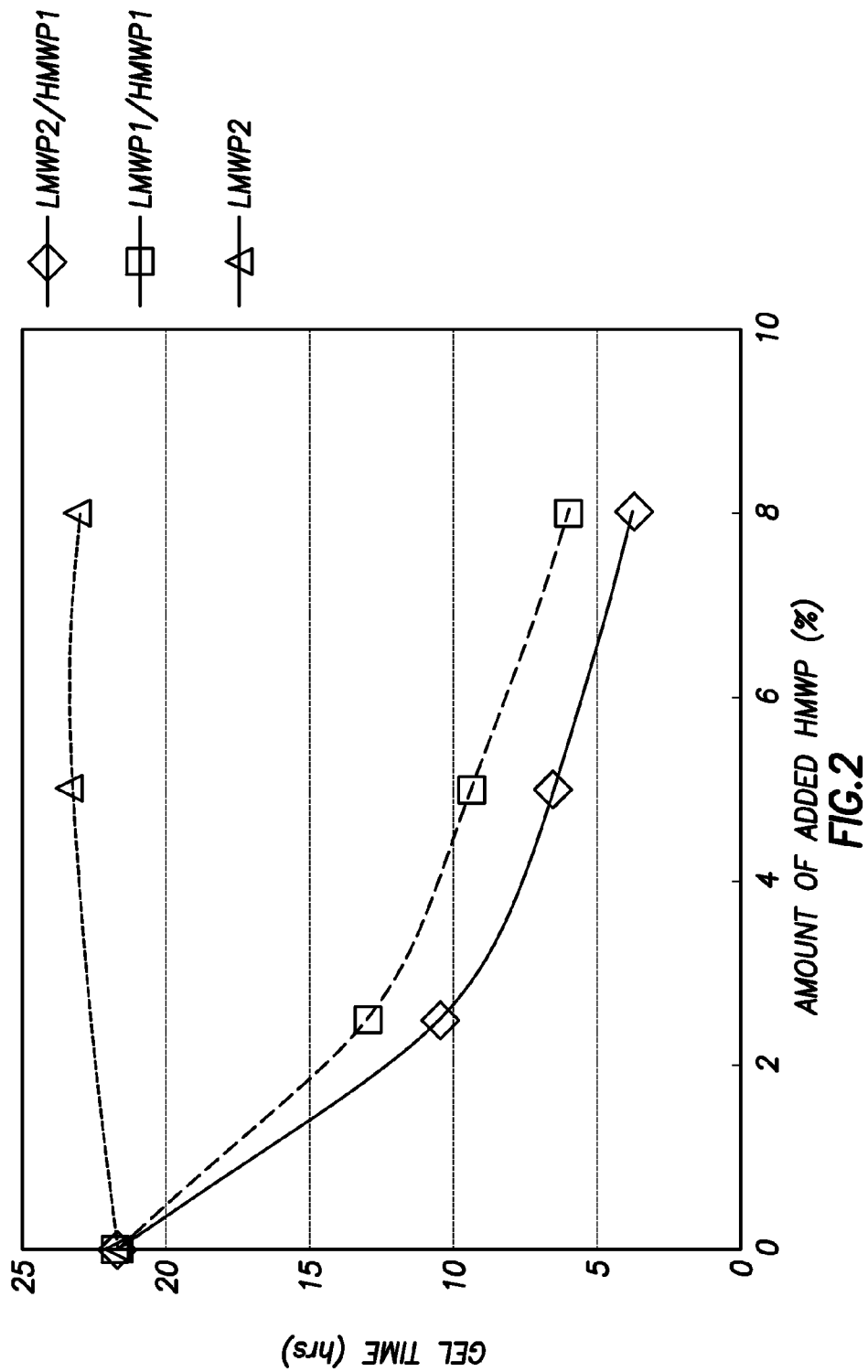
FIGS. 2 and 3 show illustrative plots of gel time as a function of the percentage of high molecular weight polymer added to two different low molecular weight polymers in the presence of an organic crosslinking agent.
Figure 3:
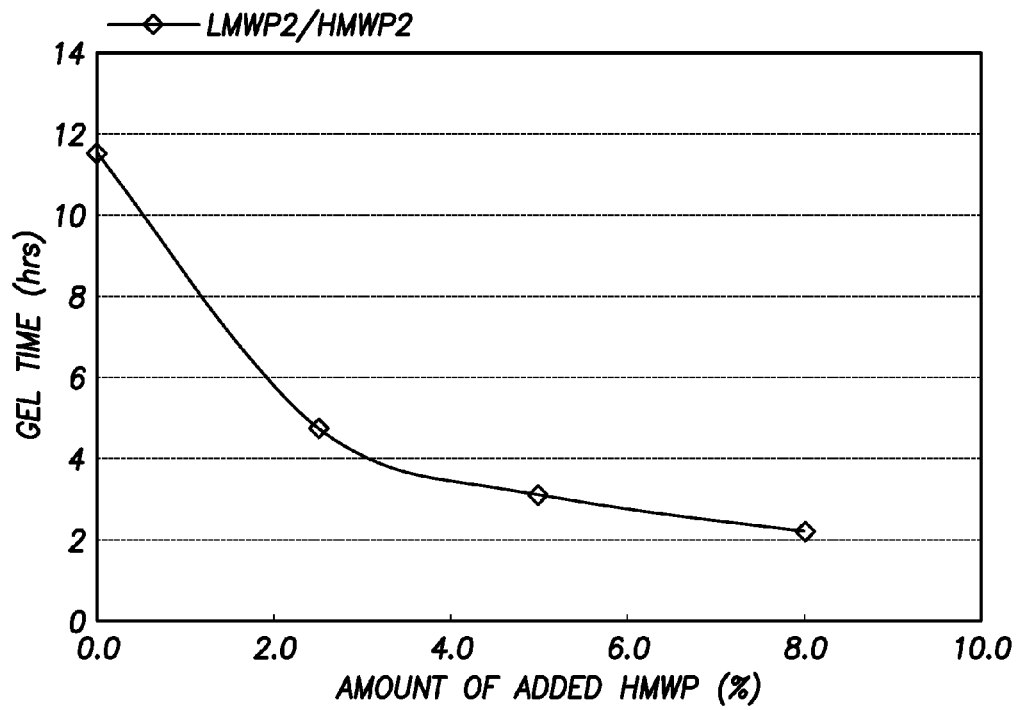

The data from Table 3 is plotted in FIGS. 2 and 3. FIGS. 2 and 3 show illustrative plots of gel time as a function of the percentage of high molecular weight polymer added to two different low molecular weight polymers in the presence of an organic crosslinking agent. A plot of gel time as a function of concentration for one low molecular weight polymer alone is also presented for comparison in FIG. 2. For the data in FIG. 2, gellation took place at 120° F., and for the data in FIG. 3, gellation took place at 140° F. As shown in FIG. 2 and comparing entries 10 and 11 with entry 5, simply increasing the amount of LMWP2 to provide increased total polymer quantities failed to appreciably affect the gel time. In contrast, when small amounts of HMWP1 were added to either LMWP1 or LMWP2, significant decreases in the gel time were observed. Comparing entries 10 and 11 with entries 8 and 9, respectively, showed that when the total polymer content was held constant, gellation occurred faster in the presence of HMWP1.

Comparing entries 5 and 12 with entries 4 and 9, respectively, it can be seen that when equivalent amounts of HMWP1 were used, gellation was considerably more rapid than when only HMWP1 was present. If the gel time was simply an additive effect of each contributing polymer and followed the "law of mixtures" (at a given concentration), it would be expected that the gel time in entries 4 and 9 would have been intermediate between the gel times of HMWP1 and LMWP1 or LMWP2. That is, it would be expected that the gel times for the respective polymer mixtures would have been somewhere in the range between 21.8 hours and 56 hours. Instead, the gel times surprisingly decreased as shown in Table 3.

As shown in entries 13-16 of Table 2 and FIG. 3, a similar decrease in gel time was observed when small amounts of HMWP2 were added to a fixed amount of LMWP2. It is to be noted that the gel times in entries 13-16 were shorter than the comparable data for LMWP2 presented in entries 6-9. The shorter gel times in entries 13-16 can be at least partially attributed to the higher gellation temperature used in these experiments.

Example 2

Gel Times in Gellable Treatment Fluids Comprising a Polymer Mixture Having a Low Molecular Weight Addend Polymer and a High Molecular Weight Base Polymer and an Organic Crosslinking Agent Gellable treatment fluids were formulated as set forth in Table 4 below. The carrier fluid in each case was 2% aqueous KCl, and the organic crosslinking agent was polyethyleneimine. Gellation was conducted at 140° F. Except as indicated in Table 4, the amount of base polymer was held constant. The amount of addend polymer was measured by both wt. % of the treatment fluid and relative to the amount of base polymer.

TABLE 4

| Entry | Base Polymer | Addend Polymer | Wt. % Base Polymer | Wt. % Addend Polymer | Wt. % Total Polymer | Wt. % Addend Polymer Relative to Base Polymer | Gel Time (Hr) |
|---|---|---|---|---|---|---|---|
| 1 (Control) | HMWP1 | — | 0.75 | 0.00 | 0.75 | 0.0 | 8.5 |
| 2 | HMWP1 | LMWP2 | 0.75 | 0.019 | 0.77 | 2.5 | 8.2 |
| 3 | HMWP1 | LMWP2 | 0.75 | 0.038 | 0.79 | 5.0 | 8.6 |
| 4 | HMWP1 | LMWP2 | 0.75 | 0.06 | 0.81 | 8.0 | 8.4 |
| 5 (Control) | HMWP3 | — | 0.75 | 0.00 | 0.75 | 0.0 | 31 |
| 6 | HMWP3 | LMWP2 | 0.75 | 0.015 | 0.765 | 2.0 | 30 |
| 7 | HMWP3 | LMWP2 | 0.75 | 0.030 | 0.78 | 4.0 | 28 |
| 8 | HMWP3 | LMWP2 | 0.75 | 0.045 | 0.0795 | 6.0 | 27 |

Figure 4:
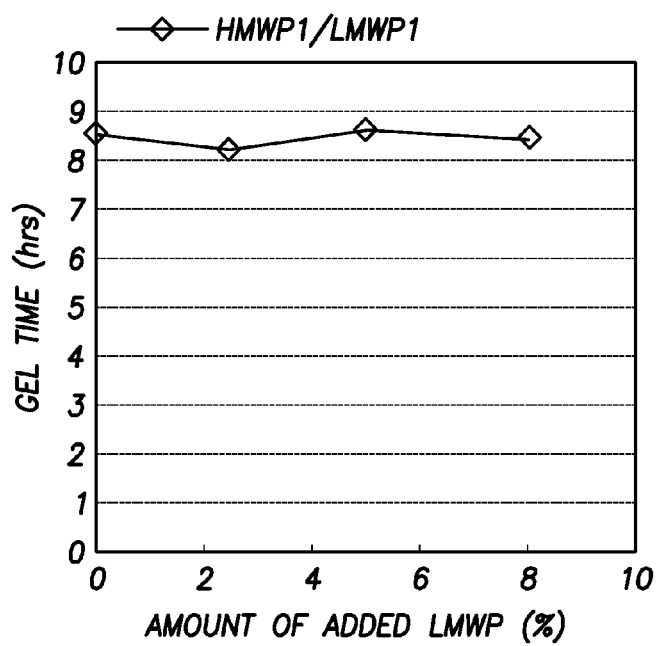
FIGS. 4 and 5 show illustrative plots of gel time as a function of the percentage of low molecular weight polymer added to a high molecular weight polymer in the presence of an organic crosslinking agent.
Figure 5:
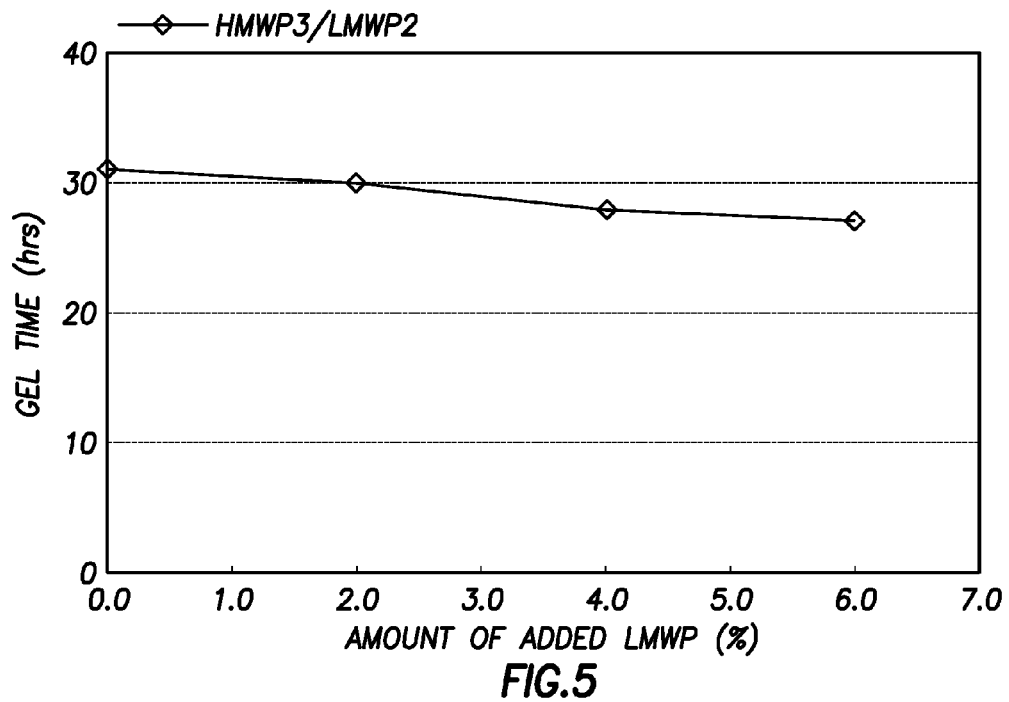

FIGS. 4 and 5 show illustrative plots of gel time as a function of the percentage of low molecular weight polymer added to a high molecular weight polymer in the presence of an organic crosslinking agent. As shown in Table 4 (entries 1-4) and FIG. 4, addition of small amounts of LMWP2 to HMWP2 resulted in substantially no effect on the gel time compared to the high molecular weight polymer alone. In contrast, as shown in Table 4 (entries 5-8) and FIG. 5, addition of small amounts of LMWP2 to HMWP3 resulted in some reduction of the gel time compared to the high molecular weight polymer alone. As shown in Table 4 and FIG. 5, the gel time reduction was not as profound as when small amounts of a high molecular weight polymer were added to a low molecular weight polymer base polymer. Without being bound by theory or mechanism, it is believed that the difference in behavior between HMWP2 and HMWP3 can be attributed to their different average molecular weights. It is believed that HMWP2 and LMWP2 are too closely related in average molecular weight for small quantities of LMWP2 to substantially affect the gel time of the HMWP2 base polymer. Evidently, this difference in average molecular weight is sufficient to produce a reduced gel time when LMWP2 is the base polymer, as shown in Example 1 above. HMWP3 and LMWP2 have a greater average molecular weight separation, which may allow a reduction in gel time of the HMWP3 base polymer to take place in the presence of small quantities of LMWP2. In the alternative, the higher molecular weight of HMWP3 may promote more rapid gellation.

Example 3

Gel Times in Gellable Treatment Fluids Comprising a Polymer Mixture Having a High Molecular Weight Addend Polymer and a Low Molecular Weight Base Polymer and an Inorganic Crosslinking Agent Gellable treatment fluids were formulated as set forth in Table 5 below. The carrier fluid in each case was tap water, and the crosslinking agent was $Cr^{3+}$ propionate, which was present at a concentration of 1.0 gal/1000 gallons fluid (0.49 wt. % $Cr^{3+}$ propionate). Glacial acetic acid was also included as a gel time retarder in each case at a concentration of 1.5 gal/1000 gallons fluid (0.16 wt. %). For each entry, gellation was conducted at 120° F.

weight addend polymer at a fixed concentration of an inorganic crosslinking agent. As shown in Table 5 and FIGS. 6 and 7, gel times decreased when increasing amounts of a high molecular weight addend polymer were added to a low molecular weight base polymer in the presence of an inorganic crosslinking agent.

Figure 8:
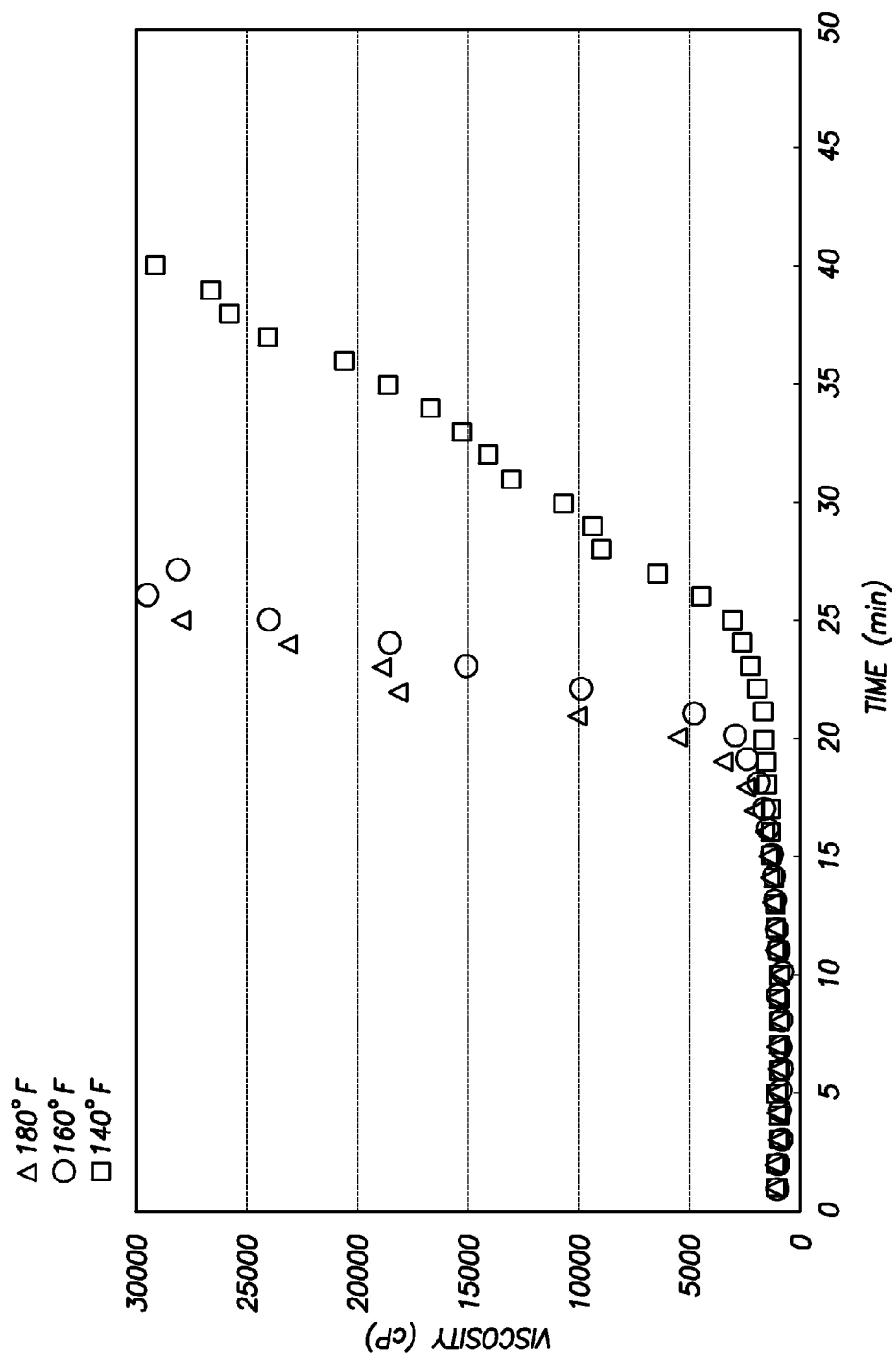
FIG. 8 shows an illustrative plot of the change in viscosity as a function of time for a high molecular weight polymer gelled at various temperatures in the presence of an inorganic crosslinking agent.

Separate gellation reactions were run under related conditions for HMWP3 to demonstrate the suitability of the inorganic crosslinking agent for crosslinking this polymer. In the case of HMWP3 alone, the gellation reactions were conducted at 140° F.-180° F. in 2% aqueous KCl solution instead of tap water. FIG. 8 shows an illustrative plot of the change in viscosity as a function of time for a high molecular weight polymer gelled at various temperatures in the presence of an inorganic crosslinking agent. As shown in FIG. 8, the inorganic crosslinking agent was effective to promote crosslinking, as evidenced by the increased viscosity with time, and the increase in viscosity occurred more rapidly at higher temperatures. As also shown in FIG. 8, gellation occurred much more rapidly with the high molecular weight polymer alone.

Figure 9:
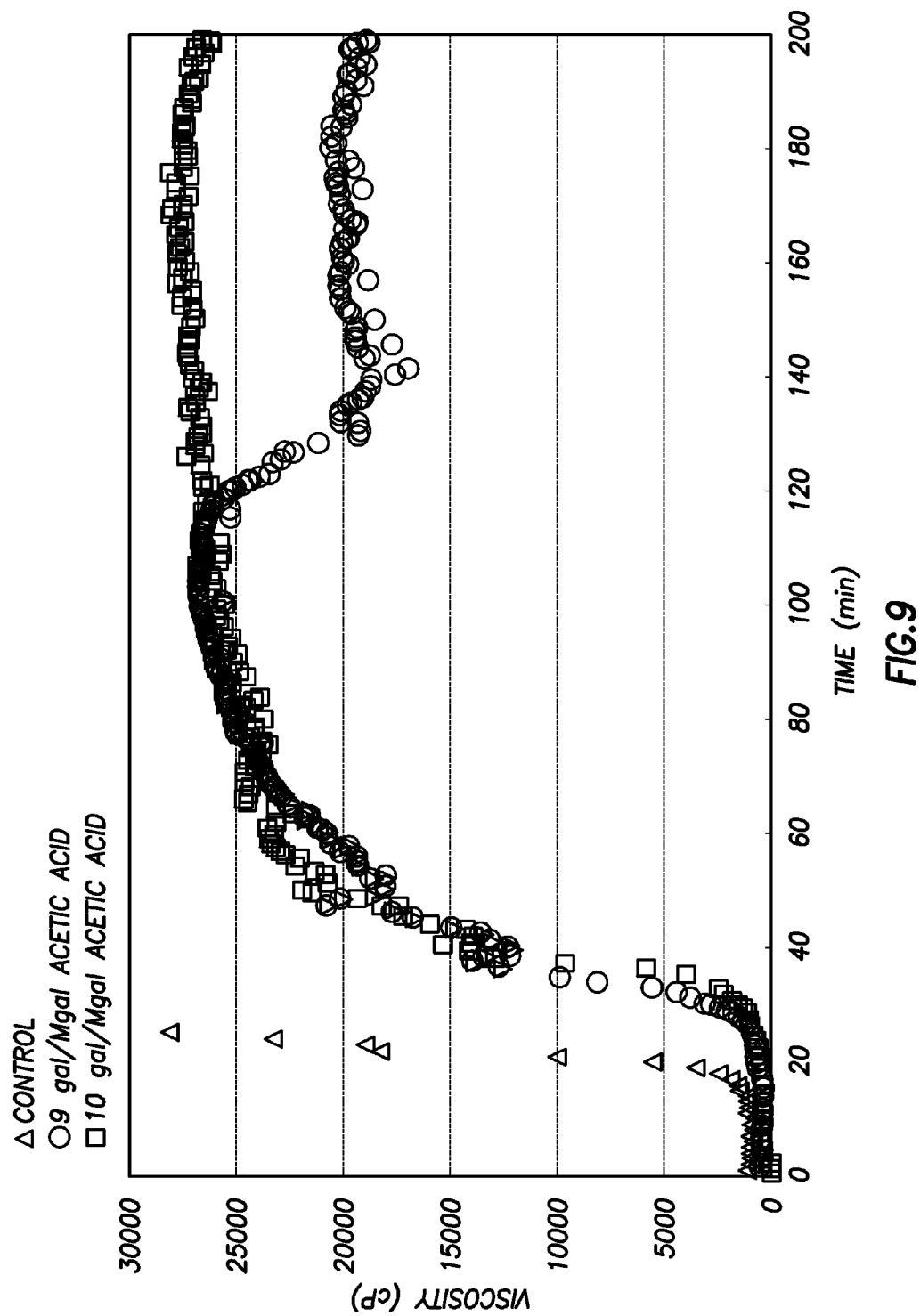
FIG. 9 shows an illustrative plot of the change in viscosity as a function of time for a high molecular weight polymer gelled at 180° F. in the presence of an inorganic crosslinking agent and acetic acid gel time retarder.

In addition, gellation of HMWP3 in the presence of an inorganic crosslinking agent was delayed by the addition of acetic acid to the gellation reaction. FIG. 9 shows an illustrative plot of the change in viscosity as a function of time for a high molecular weight polymer gelled at 180° F. in the presence of an inorganic crosslinking agent and acetic acid gel time retarder. Gellation was conducted at 180° F. under similar conditions to those described above in regard to FIG. 8, except 9 gal/mgal (0.95 wt. %) or 10 gal/mgal (1.05 wt. %) glacial acetic acid was added to the gellation reaction. As shown in FIG. 9, addition of glacial acetic acid to the gellation reaction nearly doubled the gel time compared to that observed when no acetic acid was present.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are

TABLE 5

| Entry | Base Polymer | Addend Polymer | Wt. % Base Polymer | Wt. % Addend Polymer | Wt. % Total Polymer | Wt. % Addend Polymer Relative to Base Polymer | Gel Time (Hr) |
|---|---|---|---|---|---|---|---|
| 1 (Control) | LMWP1 | — | 3.24 | 0.00 | 3.24 | 0.0 | 9.5 |
| 2 | LMWP1 | HMWP3 | 3.24 | 0.065 | 3.31 | 2.0 | 7.0 |
| 3 | LMWP1 | HMWP3 | 3.24 | 0.13 | 3.37 | 4.0 | 5.0 |
| 4 | LMWP1 | HMWP3 | 3.24 | 0.19 | 3.43 | 5.9 | 4.5 |

Figure 6:
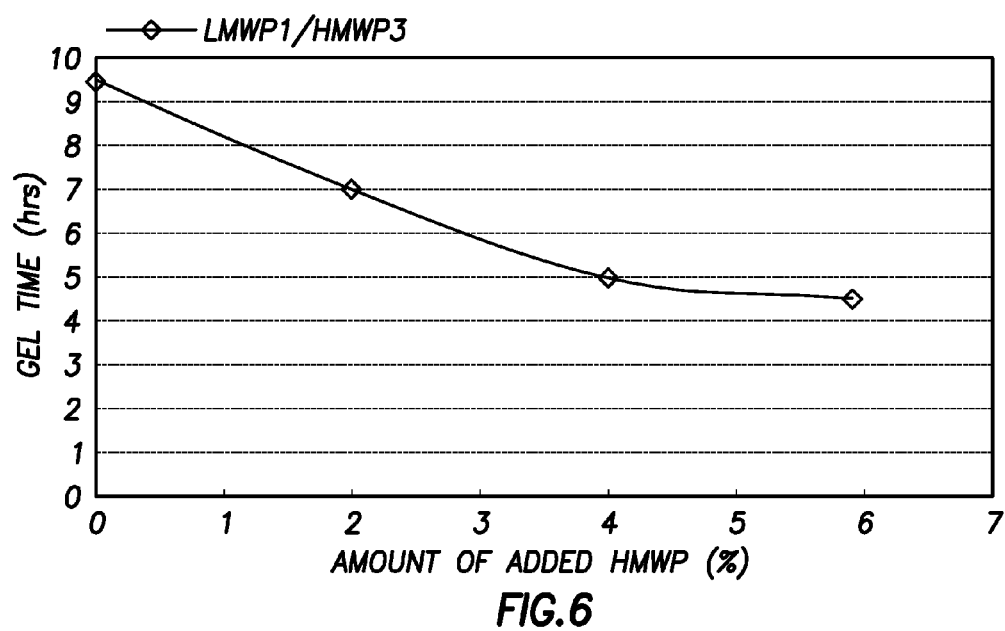
FIG. 6 shows an illustrative plot of gel time as a function of the percentage of high molecular weight polymer added to a low molecular weight polymer in the presence of an inorganic crosslinking agent.
Figure 7:
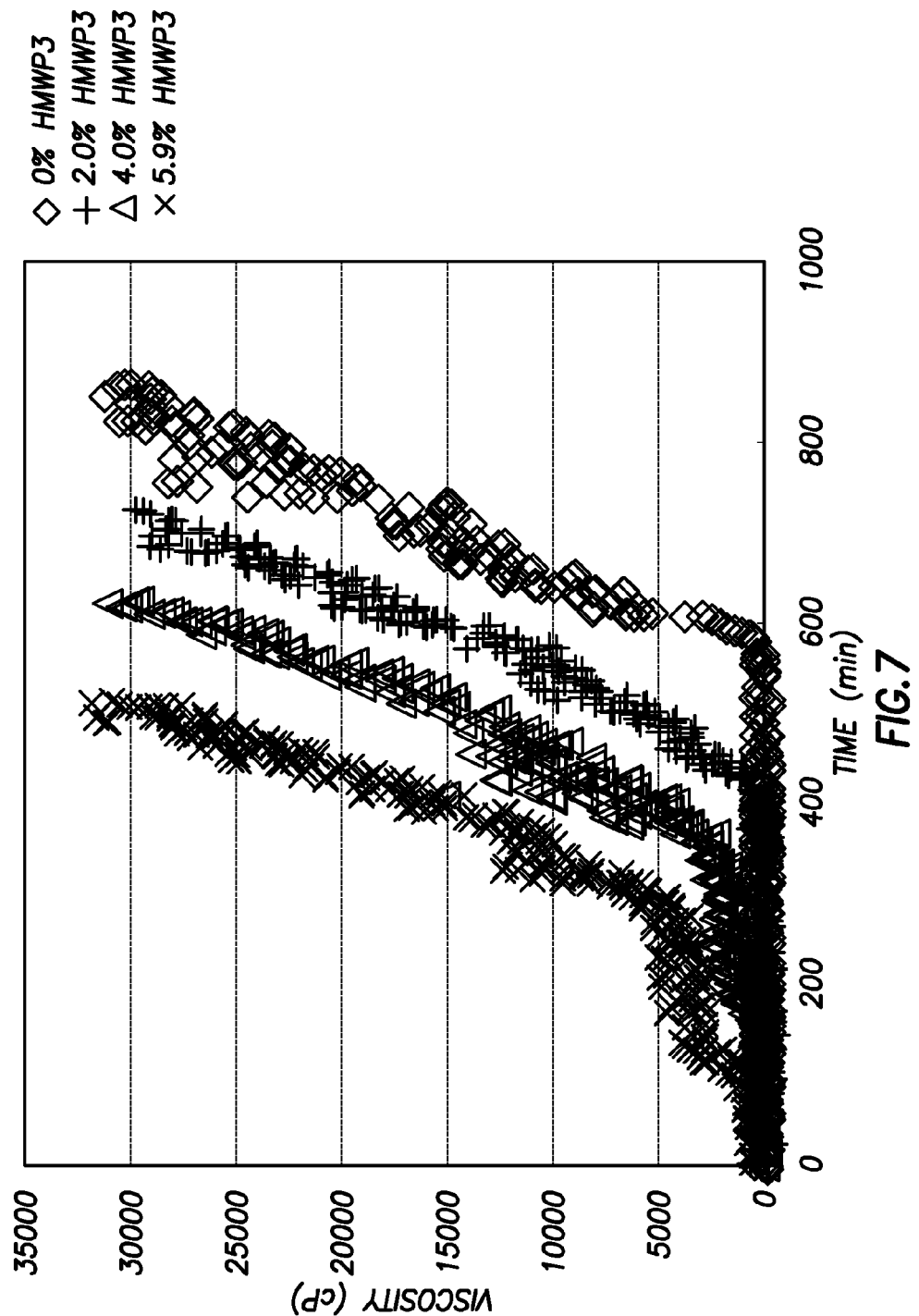
FIG. 7 shows an illustrative plot of the increase in viscosity as a function of time for gellable polymer systems containing a low molecular weight base polymer and various percentages of high molecular weight addend polymer at a fixed concentration of an inorganic crosslinking agent.

FIG. 6 shows an illustrative plot of gel time as a function of the percentage of high molecular weight polymer added to a low molecular weight polymer in the presence of an inorganic crosslinking agent. FIG. 7 shows an illustrative plot of the increase in viscosity as a function of time for gellable polymer systems containing a low molecular weight base polymer and various percentages of high molecular considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

What is claimed is the following:

1. A gellable treatment fluid comprising:
a polymer mixture comprising a base polymer and an addend polymer, the base polymer and the addend polymer each comprising an acrylamide monomer unit or a derivative thereof and having different average molecular weights, such that a molecular weight distribution of the polymer mixture contains at least two local maxima;
wherein the base polymer has a lower average molecular weight than does the addend polymer and an average molecular weight ratio of the addend polymer to the base polymer is at least about 7:1; and
a crosslinking agent comprising a transition metal ion or a crosslinking polymer.

2. The gellable treatment fluid of claim 1, wherein the crosslinking agent comprises a crosslinking polymer selected from the group consisting of polyethyleneimine, polyvinylamine, any derivative thereof, any salt thereof, and any combination thereof.

3. The gellable treatment fluid of claim 1, wherein the gellable treatment fluid has a viscosity of about 500 cP or less.

4. The gellable treatment fluid of claim 1, wherein the addend polymer comprises between about 0.1% and about 25% of the polymer mixture by weight.

5. The gellable treatment fluid of claim 1, wherein the acrylamide monomer unit comprises an amide group and up to about 10% of the amide groups in the addend polymer are hydrolyzed to carboxylic acids.

6. The gellable treatment fluid of claim 1, wherein the base polymer and the addend polymer also differ from one another in at least one aspect other than their average molecular weights.

7. The gellable treatment fluid of claim 1, wherein at least one of the base polymer or the addend polymer comprises a partially hydrolyzed polyacrylamide or a copolymer of acrylamide and t-butyl acrylate.

8. The gellable treatment fluid of claim 1, wherein the polymer mixture comprises between about 0.5% and about 15% by weight of the gellable treatment fluid.

* * * * *